United States Patent
Briskman et al.

(10) Patent No.: US 8,195,094 B1
(45) Date of Patent: Jun. 5, 2012

(54) COGNITIVE MODULATORS

(75) Inventors: Robert Briskman, New York, NY (US);
Greg A. Nease, New York, NY (US);
Nenad Popovic, New York, NY (US)

(73) Assignee: Sirius XM Radio, Inc., New York, NY (US)

( * ) Notice: Subject to any disclaimer, the term of this patent is extended or adjusted under 35 U.S.C. 154(b) by 0 days.

(21) Appl. No.: 12/930,618

(22) Filed: Jan. 12, 2011

(51) Int. Cl.
H04B 1/00 (2006.01)
H04B 7/00 (2006.01)
(52) U.S. Cl. .................. 455/42; 455/63.1; 455/67.11
(58) Field of Classification Search .............. 455/42, 455/63.1, 67.11, 67.13, 161.1, 560
See application file for complete search history.

(56) References Cited

U.S. PATENT DOCUMENTS

| | | |
|---|---|---|
| 2006/0035593 A1 | 2/2006 | Leeds |
| 2006/0229751 A1 | 10/2006 | Barnhill |
| 2008/0160928 A1 | 7/2008 | Tsfaty et al. |
| 2009/0270047 A1 | 10/2009 | Heijnen |
| 2009/0275299 A1 | 11/2009 | Buch et al. |

*Primary Examiner* — Tuan H Nguyen
(74) *Attorney, Agent, or Firm* — Patrick F. Bright

(57) ABSTRACT

A modulator includes input paths for audio information from an electronic audio channel; output paths for transmitting said audio information over a frequency-modulated radio frequency signal to a FM broadcast receiver; and one or more programs for measuring or estimating the spectrum environment of the frequency-modulated RF signal bearing the audio information through sampling and analysis to select an optimum radio signal level and signal transmission mode for transmission to the FM receiver in a near interference free manner.

11 Claims, 1 Drawing Sheet

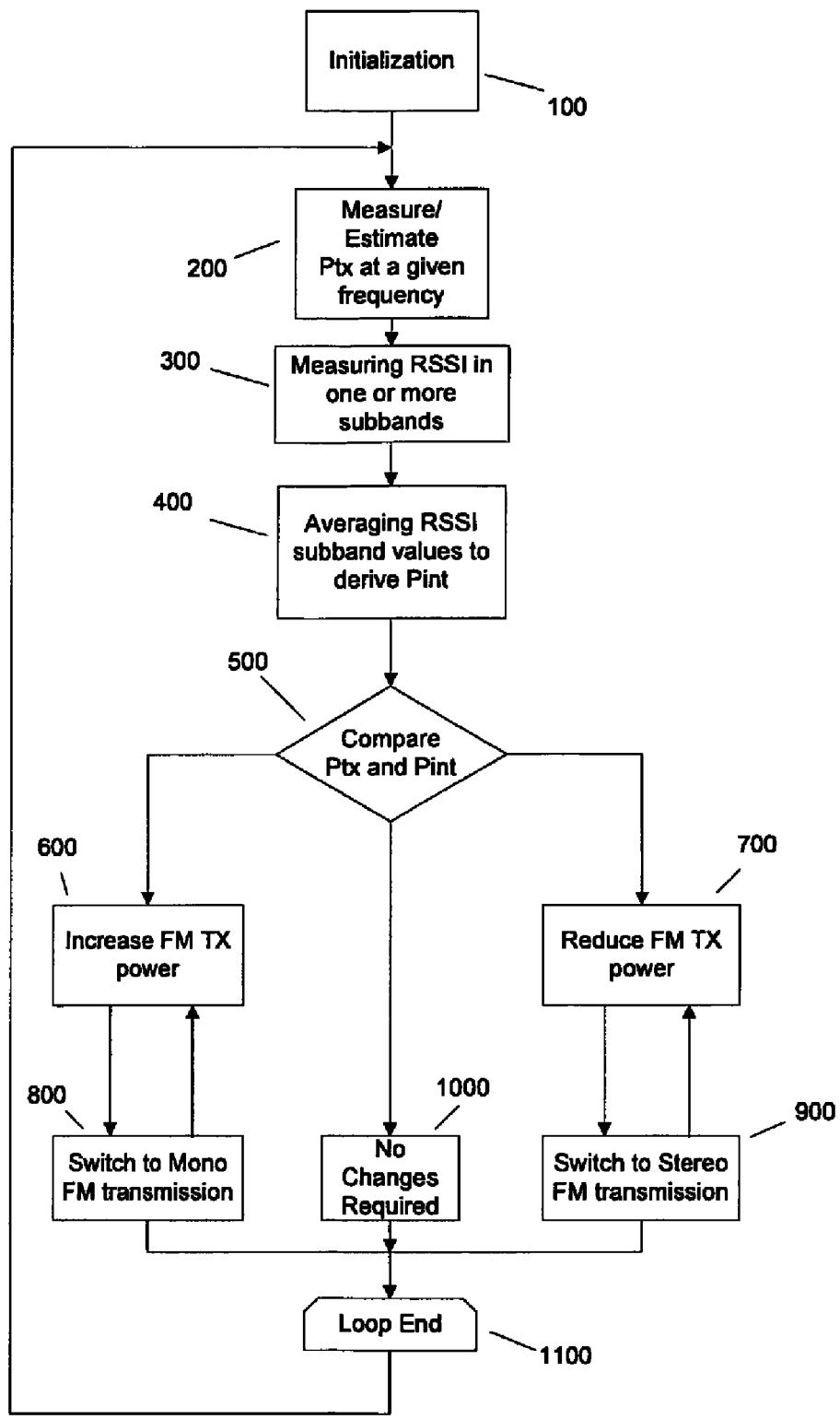

COGNITIVE MODULATORS

Adaptive frequency modulation (FM) modulators, called cognitive modulators, transmit/inject audio from a source such as a cellular telephone, satellite radio receiver, navigation instrument, personal multimedia player (PMP), iPod and similar devices into an automotive or portable entertainment sound system's FM receiver. These modulators intelligently adjust their radio frequency (RF) transmission level and modulation parameters to provide the best available audio injection performance and to minimize interference into other devices/services operating at or near the same RF wavelength.

Consumers now have many products, either portable or aftermarket-installed, that produce audio which such consumers would like to hear played over their existing portable and vehicular sound systems. Unfortunately, most audio sound systems do not provide a convenient input to accept audio from external sources. This lack of convenient direct access is true especially in many vehicles used today. Injection of an FM modulated signal has been used in the consumer market for over ten years to provide an audio interface for vehicular and home sound systems lacking direct convenient access. See U.S. Pat. No. 6,023,616 (Briskman); U.S. patent publication 2008/062053 (Marko); U.S. patent publication 2008/0076352 (Der); and U.S. Pat. No. 6,810,233 (Patsiokas). Such devices/systems use a frequency modulation (FM) modulator circuit to transmit audio carried on a radio frequency (RF) signal into a car or portable audio system via its FM broadcast receiver. If RBDS (RDS in Europe) decoding functionality is available in the sound system's receiver, the FM modulator may also send data to that broadcast receiver via RBDSD/RDS FM subcarrier modulation methods. The target FM broadcast receiver may display the data portion of the signal as text. Such text display may also be associated with the audio programming. Such modulators may deliver to the FM broadcast receiver audio (e.g., voice, music, etc.) and data from incoming cell phone calls (i.e., hands free operation), satellite radio receivers, iPhones, iPads, navigation instruments and similar devices.

Current FM modulators do not work well in many places, especially in vehicles. Being unlicensed devices, FM modulators are restricted by the Federal Communications Commission (FCC) to very low power RF emissions that are easily and often interfered with by moderate signals from in-area FM broadcast transmitters, either co-channel or from channels adjacent to the FM modulator's chosen frequency of operation. Even weak co-channel FM broadcast signals may degrade the quality of FM modulator-injected audio. Short of direct wiring the modulator's RF output to the vehicle receiver antenna input, an inconvenient installation for many consumers, methods to minimize or overcome such interference reliably have not worked well. Particularly challenging are "commuter" applications in which a vehicle may travel across suburban geographical areas, over which the FM broadcast station spectrum occupancy will change. For example, a user may locate a frequency (FM channel) that seems unoccupied or very weakly occupied and seems therefore to be a good candidate frequency for use with an FM modulator. However, driving just a few miles toward that weak signal broadcast transmitter site may turn its signal into a formidable interferer to the FM modulator. At this point, the listener must re-tune both the FM modulator and the vehicle receiver to another, hopefully unoccupied, FM frequency if one is available. This is very inconvenient and potentially dangerous, especially while driving.

The interference environments for FM modulators will worsen, as the Federal Communications Commission recently authorized a ten times (10 dB) increase in FM broadcast station transmitter power for In Band On Channel (IBOC or "HD Radio") digital radio broadcasts. FM IBOC already poses a severe challenge to the useful operation of FM modulators, as IBOC sideband power is located substantially in each of the two FM frequency sub-channels adjacent to that of the host FM IBOC analog station. This means an FM channel, once considered "unoccupied" in a geographical area, now may contain significant IBOC digital signal energy linked to one or both of its adjacent sub-channel FM broadcasts. With the allowed IBOC transmission power increase, these formerly unoccupied or weakly occupied channels may become useless for FM modulators over large geographical regions.

The modulators proposed herein accept audio inputs from an electronic audio channel and transmit these inputs to an FM receiver so that a listener to the receiver hears it with high quality despite radio frequency noise and FM radio stations' broadcast interference throughout North America. The modulators measure or estimate the RF spectrum environment through sampling and analysis to select the appropriate radio signal level for transmission to the FM receiver so the listener always hears a high quality output. An electronic audio channel may be an analog or digital signal of voice, music or data and combinations thereof, including FM mono and stereo, cellular telephone, mapping data and RBDS/RDS.

Sampling and analysis of the spectrum to be used for the FM modulator's transmission in either the time or frequency domain or combinations of these includes optimization of the sampling by use of the characteristics of the specific signal to be transmitted and/or by use of frequency agility.

The modulators described herein provide variable transmitter power, or adjustments of transmission mode parameters, or combinations of both, for reception by a target FM receiver to overcome interference from co-channel and/or adjacent channel users and other noise components at the FM modulator's transmitter radio frequency. These modulators also minimize interference back into co-channel and/or adjacent channel users' receivers, as its transmitted signal field strength is not allowed to be much higher than the aggregate average field strength of the ambient co-channel interference and noise.

Transmission mode parameters include one or more of: FM stereophonic/monophonic audio mode, FM analog and digital subcarrier transmissions and/or FM modulation index, all of which affect and determine the occupied bandwidth characteristics of the transmitted FM signal.

The cognitive modulators described herein address interference challenges by detecting/measuring interference and noise (I+N) energy in the spectral vicinity of their transmission frequency. With this information, the modulators adjust their transmission parameters to compensate, proportionally or otherwise, for the interference and noise levels in this spectral vicinity. The cognitive modulators also estimate (I+N) in the modulators' spectral bandwidth of operation, and use these estimates to set the modulators' optimal transmission power level in combination with selection of the transmission mode.

Cognitive modulator systems of this invention comprise: (1) a switchable stereo/mono FM modulator with programmable RF output power level, (2) a frequency-agile FM sampling receiver capable of measuring and reporting received signal power, and (3) a processing device that runs programs/algorithms to control the FM modulator and FM sampling receiver, and that collects and processes measurement data from the sampling receiver.

These modulators measure the interference and noise, (I+N), at and near their transmission frequency channel, and adjust their carrier output power, (C). The resulting C/(I+N) reaching the vehicle's FM receiver is sufficient to provide the user a good audio signal-to-noise ratio (S/N). The reception and measurement of (I+N) at the modulator frequency can be done by turning off the cognitive modulator's transmitter briefly to measure/detect the remaining (I+N) level.

Earlier FM modulator systems sometimes turned off the modulator's transmitter and scanned the FM band for unoccupied channels, but such modulators only reported which unoccupied channels, if any, were good candidates for application of the FM modulator. Such FM modulators did not employ variable power control of the modulator's carrier to optimize performance, automatically or otherwise.

The cognitive modulators of this invention can also estimate (I+N) without turning off FM modulator output power. These modulators do so by sampling energies at frequencies spectrally near the transmission frequency, either at one or more adjacent frequencies, or at frequencies located between the modulator's center frequency and the adjacent channels, called "subband" or "sub-channel" or "sub-adjacent" frequencies. These methods are effective, as the (I+N) spectral signatures generally extend over a frequency range much broader than the operating frequency range of the cognitive modulator. Sampling of sub-adjacent frequencies is done using a narrower sampling receiver bandwidth than used for full on-channel or adjacent channel signal sampling. For example, the bandwidth of the cognitive modulator's sampling receiver may normally be in the ranges of 100 kHz to 200 kHz. But for sub-adjacent signal sampling, the sampling receiver bandwidth would be narrowed, for example to 10 kHz to 30 kHz. Knowing the characteristics of the typical FM broadcast signal spectrum allows post processing to convert the narrow-band sampled adjacent channel measurements to good estimates of the co-channel broadcast station energy.

In some embodiments, the modulators' sampling receivers collect a series of (I+N) power spectral density (power within a known sampling receiver bandwidth) measurements at various spectral locations at or near the cognitive modulator's transmission frequency. The modulators then weight each sample, depending upon location relative to the center transmission frequency, and time of measurement relative to the present time ("age" of the sample). This produces an array of weighted samples across windows in time and frequency. The weighted sample arrays may be used to calculate estimates of (I+N) used in the decision process for adjusting the cognitive modulator's transmission power and transmission mode.

Well-designed processes for time and frequency sampling, weighting and averaged combining yield good (I+N) estimation accuracies, even in specular multipath fading and burst-filled noise environments. The specific sampling, weighting and windowed averaging algorithm is chosen to match the general type of interference and noise environment. As a result, the cognitive modulator may track and compensate interference and noise where the interference and noise arise from several different sources, whether or not these are correlated.

Accuracy of sub-adjacent sampling may be increased as follows:
(1) The deviation of the cognitive modulator may be reduced temporarily during sub-adjacent measurements. This clears the main channel's outer edges of cognitive modulator energy during the sampling measurement. Maintaining the cognitive modulator's output power reduces the audio artifacts produced in the target receiver arising from on/off cycling of the cognitive modulator's carrier.
(2) The cognitive modulator may sample sub-adjacent frequencies during periods of low audio modulation when the cognitive modulator's output bandwidth will be narrower. As the cognitive modulator can detect the audio levels used to modulate its FM carrier, it can also recognize those times when the audio modulation is low.
(3) Switching the audio modulation signal from FM multiplex stereo to FM mono during sub-adjacent channel sampling further narrows the cognitive modulator's emissions bandwidth, and can improve results.

In particular, the modulators may switch their multiplex stereo transmission mode between stereophonic, transmitting with a 19 kHz stereo pilot accompanied by L+R and L−R audio spectral components, and monophonic, transmitting only L+R audio without a 19 kHz stereo pilot. Monophonic transmission requires a lower received C/(I+N) to achieve a target demodulated audio signal-to-noise (S/N) ratio than does stereophonic transmission. Control of stereo/mono transmission mode may help to optimize audio S/N in the target FM broadcast receiver, particularly during short, difficult interference periods (e.g., noise bursts). For example, the cognitive modulator may use stereo/mono control as an extension of the modulator's adaptive power control. Using monophonic transmission can resist further degradation of the target receiver's audio S/N when the modulator has reached its maximum transmission power, and where the interference and noise (I+N) continue to increase.

Besides mitigating the interference problems of modulator users, the cognitive modulators may also minimize interference by it into co-channel users of other services. When and where the (I+N) is low, the cognitive modulator output power will be low. Where co-channel signals are high, the cognitive modulator will produce a stronger signal. But that stronger signal will be innocuous to the other co-channel users, as these will be able to endure a controlled, proportional increase in the cognitive modulator's signal without effect since their desired received signal is also stronger.

Moreover, the cognitive modulator is the "local" signal source for the target FM receiver, so its power falls off much more rapidly over distance in the local environment than does a signal from a distant transmitter. The typical inverse square to cube law ($1/d^2$ to $1/d^3$) propagation geometries protect co-channel users effectively.

The cognitive modulator systems are compatible with, and may be combined with transmission of RBDS/RDS data to a target FM broadcast receiver, with/without accompanying stereo or mono audio transmissions.

BRIEF DESCRIPTION OF THE DRAWING

The drawing illustrates, schematically, a flowchart for a program useful in implementing the new cognitive modulators.

DETAILED DESCRIPTION OF THE DRAWING

The drawing is a simplified flowchart of a program that generates an appropriate adjustment in power to a FM transmitter from a cognitive modulator. After initialization at 100 of the modulator, which may include powering up and resetting to a desired default value, the program calls for measuring or estimating the cognitive modulator's FM transmitter power, denoted Ptx or C, at a known, desired frequency, e.g., 87.7 MHz, then calls for measurement of RSSI (receiver signal strength indicator) in a plurality of subbands that are close to, but larger or smaller in frequency than the desired frequency Ftx (300). The program then averages this plurality of values at 400 using windowing or other methods to obtain a resultant value denoted Pint, or I, which is an estimate of the undesired Noise plus Interference from other sources that are present at the desired frequency. At 500, the program compares the Ptx and Pint values and determines whether the ratio of C/I is in the proper range for good audio performance at the receiver, or if C requires adjustment upward to effect an improvement in audio quality or downward to reduce interference to other, cochannel users. Alternatively, or in addition, at 800, the program may call for switching the signal, if in Stereo FM transmission mode, to Mono FM mode to reduce the bandwidth of the modulator signal, thereby reducing the Noise component of I with respect to C in the listener's FM receiver. At 600, the program calls for increasing C adequately to overcome I for a listener to hear good quality audio. At 700, the program calls for decreasing C if I is too low to interfere with FM transmission. Alternatively, or in addition, at 700, the program may call for switching the signal to Stereo FM transmission mode, if the signal is already in Mono form, but the ratio of C/I is great enough to support Stereo performance. If at 500, the comparison of C to I indicates audio performance is good and no changes to C are required, then the program loops through step 1000 and to 1100. At 1100, the program reverts to 200 to repeat the process, as necessary.

What is claimed is:

1. A modulator comprising input paths for audio information from an electronic audio channel; output paths for transmitting said audio information over a frequency-modulated radio frequency signal to an FM broadcast receiver; means for measuring or estimating the local RF reception environment of the frequency-modulated RF signal bearing the said audio information through sampling and analysis to select an appropriate radio signal level for near interference free transmission to said FM receiver; and means for measuring the interference and noise, at and near a transmission frequency channel, without turning off FM modulator output power, and adjusting carrier output power, without turning off FM modulator output power, to provide a target FM broadcast receiver with audio having a desired signal-to-noise ratio.

2. The modulator of claim 1, wherein said electronic audio channel comprises an analog or digital signal of voice, music, data and combinations thereof, including FM mono and stereo, cellular telephone, mapping data and RBDS/RDS.

3. The modulator of claim 1, wherein said electronic audio channel comprises FM mono and stereo, or cellular telephone, or mapping/navigation data or RBDS/RDS.

4. The modulator of claim 1, further comprising means for varying modulator transmitter power, for adjusting transmission mode parameters, or both, to overcome interference from co-channel users, adjacent channel users and ambient noise at the transmitter radio frequency.

5. The modulator of claim 1, further comprising means for minimizing its potential interference back into co-channel users' receivers, adjacent channel users' receivers, or both.

6. The modulator of claim 1, further comprising means for detecting/measuring interference and noise energy in the spectral vicinity of the frequency-modulated RF signal bearing the audio information, and for adjusting transmission parameters to compensate, proportionally or otherwise, for the interference and noise levels in said spectral vicinity, or means for estimating interference and noise energy in said modulator's spectral bandwidth of operation, and using these estimates to set optimally the modulator's transmission power level, stereo/mono transmission mode, or both.

7. The modulator of claim 1, further comprising means for collecting a plurality of power spectral density measurements over defined time periods at more than one spectral location at or near said modulator's transmission frequency, for weighting each measurement sample, and for using the weighted measurements (concurrently or averaged over a defined time period) to calculate estimates for adjusting said modulator's transmission power and transmission mode.

8. The modulator of claim 1, further comprising means for reducing deviation of said modulator while making said measurements, or means for sampling sub-adjacent frequencies during periods of low audio modulation, or means for changing the audio modulation signal from FM multiplex stereo to FM mono during sub-adjacent channel sampling.

9. A system comprising: a switchable stereo/mono FM modulator with programmable RF output power level, a frequency-agile FM sampling receiver capable of measuring and reporting received signal power, a processing device that runs programs/algorithms to control the FM modulator and FM sampling receiver, and that collects and processes measurement data from said sampling receiver; and means for measuring the interference and noise, at and near a transmission frequency channel, without turning off FM modulator output power, and adjusting carrier output power, without turning off FM modulator output power, to provide a target FM broadcast receiver with audio having a desired signal-to-noise ratio.

10. The system of claim 9, wherein said modulator comprises input paths for audio information from an electronic audio channel; output paths for transmitting said audio information over a frequency-modulated radio frequency signal to a FM broadcast receiver; and means for measuring or estimating the reception environment of the frequency-modulated RF signal bearing the said audio information through sampling and analysis to select an appropriate radio signal level for near interference free transmission to said FM receiver.

11. The system of claim 10 further comprising means for detecting/measuring interference and ambient noise energy in the spectral vicinity of the frequency-modulated RF signal bearing the audio information, and for adjusting transmission parameters to compensate, proportionally or otherwise, for the interference and noise levels in said spectral vicinity, or means for estimating interference and noise energy in said modulator's spectral bandwidth of operation, and using these estimates to set the modulator's transmission power level, stereo/mono transmission mode, or both for near interference free reception by a local FM broadcast receiver.

* * * * *